United States Patent [19]
Russo

[11] Patent Number: 5,900,583
[45] Date of Patent: May 4, 1999

[54] SURFACE MOUNT OUTLET BOX FOR SUPPORTING ELECTRICAL CEILING FAN

[75] Inventor: Thomas R. Russo, Bristol, Conn.

[73] Assignee: The Wiremold Company, West Hartford, Conn.

[21] Appl. No.: 08/990,643

[22] Filed: Dec. 15, 1997

[51] Int. Cl.⁶ ..................................................... H02B 1/30
[52] U.S. Cl. .............................. 174/61; 248/343; 220/39
[58] Field of Search ..................... 174/54, 61, 63; 248/343; 220/3.2, 3.3, 3.9; 52/39; 362/404

[56] References Cited

U.S. PATENT DOCUMENTS

| | | | |
|---|---|---|---|
| 2,861,121 | 11/1958 | Wolar | 174/61 |
| 3,012,090 | 12/1961 | Robbins | 174/52.1 |
| 4,357,506 | 11/1982 | Breining | 200/52 R |
| 4,988,067 | 1/1991 | Propp et al. | 248/343 |
| 5,183,233 | 2/1993 | LaPalomento | 248/343 |
| 5,303,894 | 4/1994 | Deschamps et al. | 248/343 |
| 5,462,412 | 10/1995 | Scofield et al. | 416/210 R |
| 5,522,577 | 6/1996 | Roesch | 248/343 |
| 5,568,969 | 10/1996 | Yu | 362/404 |
| 5,628,418 | 5/1997 | Deschamps et al. | 220/3.2 |

*Primary Examiner*—Kristine Kincaid
*Assistant Examiner*—Dhiru R Patel
*Attorney, Agent, or Firm*—McCormick, Paulding & Huber

[57] ABSTRACT

An electrical ceiling fan is supported from a two piece surface mounted outlet box. The outlet box back plate has two threaded fasteners that hold threaded posts, and that extended downwardly through holes in the outlet box cover. The fan has an adaptor plate that is also supported on these fasteners. The surface mounted outlet box has knock outs to facilitate assembly with surface mounted raceway.

9 Claims, 2 Drawing Sheets

SURFACE MOUNT OUTLET BOX FOR SUPPORTING ELECTRICAL CEILING FAN

SUMMARY OF THE INVENTION

This invention relates generally to surface mount electrical raceways and outlet boxes of the type adapted for mounting to a ceiling or the like. Such outlet boxes are generally of two-piece construction having a back plate and a cover which is secured to the back plate, and which has knock-out openings for receiving the surface mount electrical raceway that carries the electrical wires for connection to a device fitted in the outlet box cover.

In order to mount a relatively heavy electrical fan assembly to a ceiling, present practice calls for the outlet box to be recessed in the ceiling and secured to beam or other support structure of the ceiling. Conventional surface mount outlet boxes are not generally designed to support such a relatively heavy appliance, particularly an electrical ceiling fan.

In accordance with the present invention, the electrical outlet box back plate is provided with at least two depending posts, and threaded fasteners are provided through the back side of the back plate through these posts so that threaded end portions protrude beyond the posts to be receive in openings defined by the electrical outlet box cover.

Electrical ceiling fans include an adaptor plate having the requisite structural integrity for supporting the electrical fan with which it is to be used. Such an adaptor plate generally has a hole pattern which allows the adaptor plate to be secured to other structure, such as a recessed outlet box for example, and provision is made in accordance with the teaching of the present invention to utilize certain of these openings for receiving the threaded end portions of the above-mentioned fasteners. Once the adaptor plate has been so provided on the ends of such fasteners, which protrude through the cover,f the outlet box and which receive the adaptor plate, threaded nuts are provided or these exposed fastener end portions to secure the adaptor plate not only to the electrical outlet box cover, but also to the back plate itself.

The back plate will have been previously secured to the ceiling structure in accordance with conventional practice, and preferably the screw fasteners used for this purpose are secured in a beam structure in a ceiling from which the fan is to be suspended.

As a result of this unique installation process, a relatively heavy electrical ceiling fan can be supported from a surface mounted outlet box so that electrical connections can be conveniently made to the fan motor and its control circuitry. Furthermore the electrical outlet box cover is secured to the back plate in a novel manner that affords greater support for the ceiling fan than might be expected from a two component surface mount electrical box generally.

DETAILED DESCRIPTION OF THE DRAWINGS

Figure 3:
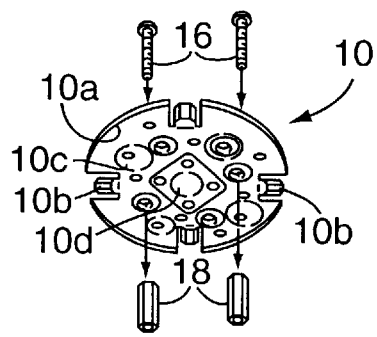
FIG. 3 is a perspective view of the outlet box back plate illustrating two threaded fasteners and two threaded posts an in exploded relationship thereto.
Figure 4:
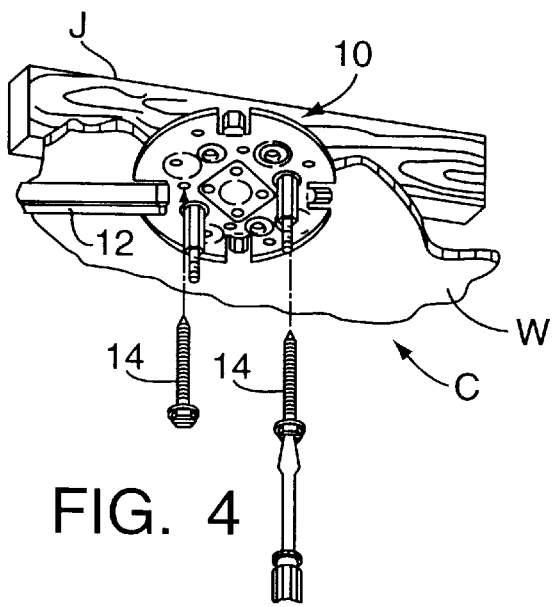
FIG. 4 is a perspective view showing the back plate of FIG. 3 after its assembly with the fasteners, and in the process of being secured to the ceiling structure.

Turning now to the drawings in greater detail, FIG. 3 shows an outlet box back plate 10 of the type formed from initially that soft or mild low carbon steel to have a downwardly turned lip 10a and at least (2) two, but preferably four (4) integrally formed tongue portions 10b, for at least one of which receives a steel raceway 12 such as indicated in FIG. 4. In further accordance with conventional practice, such an outlet box back plate typically includes a plurality of knock-out openings, such as indicated generally at 10c, and a central knock-out opening 10d to be used in the event that the outlet box is connected to wiring electrical from behind the ceiling structure C.

Figure 1:
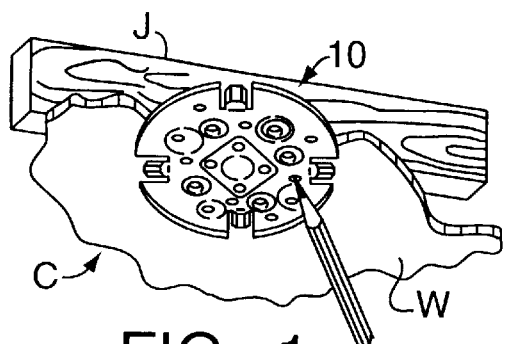
FIG. 1 Is a upwardly directed perspective view of the outlet box back plate being used as a template to mark the ceiling so that the ceiling structure can be pre drilled for supporting the outlet box to be described.

In accordance with the present invention, the outlet box back plate 10 is intended to be secured externally of such a ceiling structure C, and therefore the opening 10d is not used. As shown in FIG. 1, the back plate 10 can be used as a template for marking the location where the installer will provide screw fasteners, such as shown at 14 in FIG. 4, to secure the back plate 10 to the ceiling structure C. Preferably this location is chosen opposite a joist J or other support structure. The ceiling structure C typically includes wall board secured to the overhead joist J, such wall board being indicated generally at W. The wall board is shown broken away to better illustrate the makeup of the ceiling structure itself.

Figure 2:
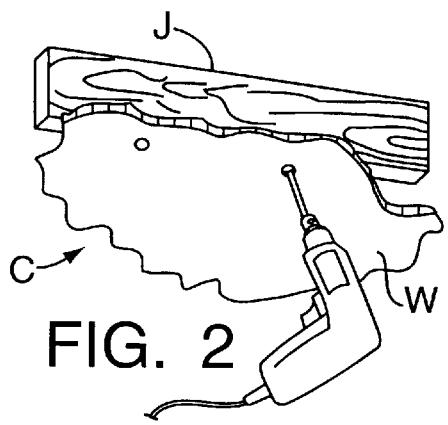
FIG. 2 is a view similar to FIG. 1, but showing the step of drilling holes in the ceiling structure for so supporting the outlet box.

Once the markings have been made and as suggested in FIG. 2, the installer will preferably drill holes of such a size as to receive the anchor screws 14, 14 shown in FIG. 4. However, prior to securing the outlet box back plate 10 to the ceiling structure C, a pair of threaded fasteners 16, 16 are passed downwardly through openings provided for this purpose in the back plate 10, as shown in FIG. 3. These fasteners 16 are secured to the metal back plate 10 by threaded posts 18, 18 that are adapted to be received on the fasteners 16 as shown in FIG. 4, and prior to securing the back plate 10 to the ceiling structure C as also suggested in 4.

Figure 5:
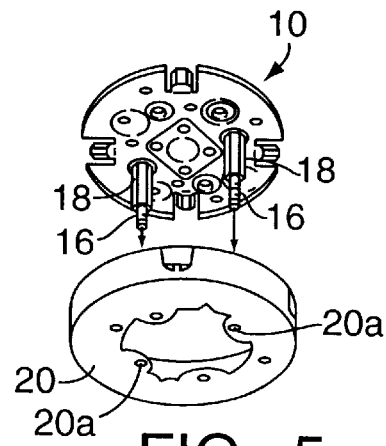
FIG. 5 is a perspective view of the back plate of FIG. 4 with the outlet box cover shown in exploded relationship thereto.
Figure 6:
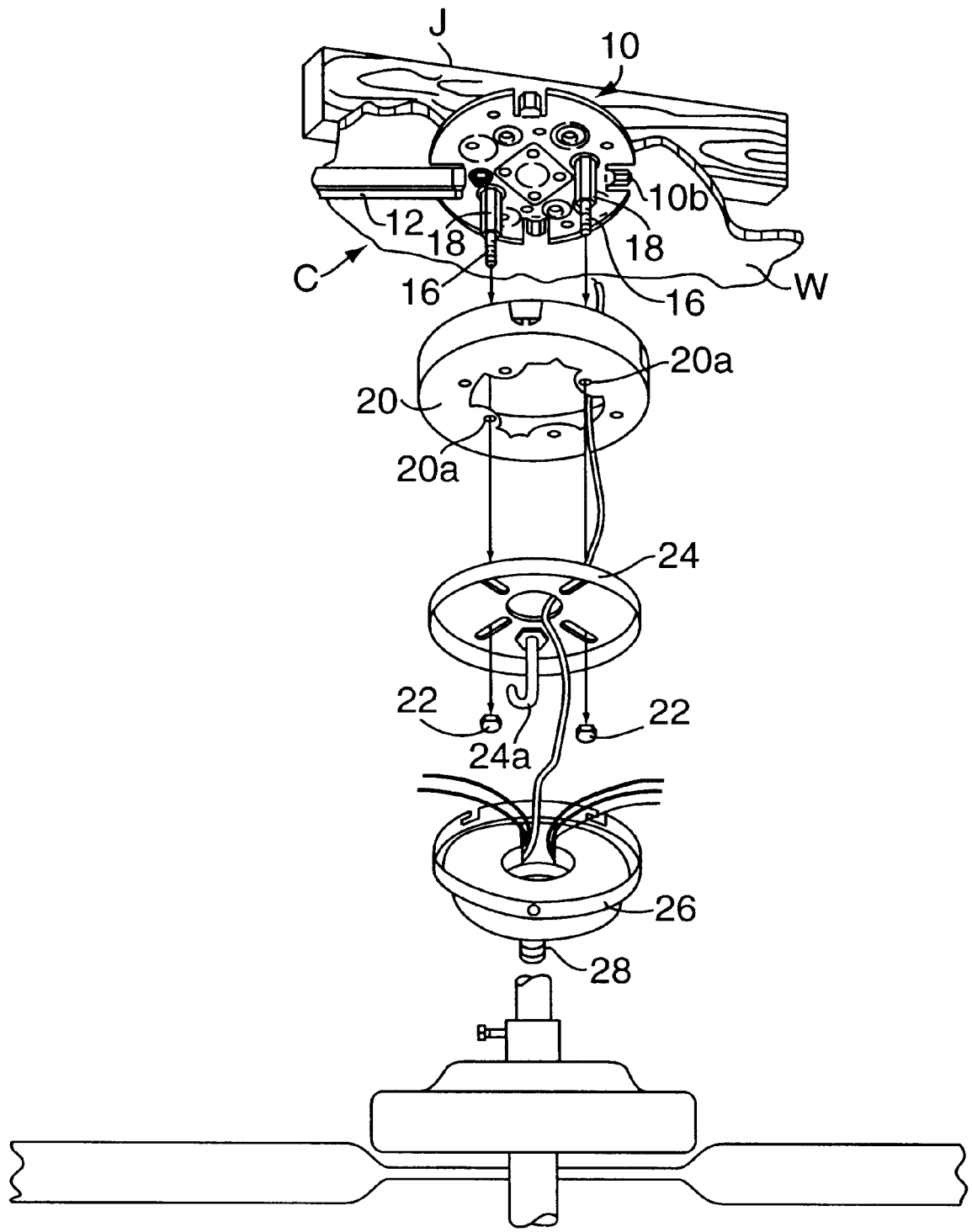
FIG. 6 is an exploded view of the back plate secured to the ceiling structure, with the electrical outlet box cover plate as shown in FIG. 5, together with an adaptor plate for the fan assembly, as well as the fan assembly itself, all in exploded relationship relative to one another.

FIG. 5 shows the makeup of the outlet box itself with the threaded posts 18, 18 secured on the screws 16, 16 and, in position for receiving an outlet box cover 20 on the threaded end portions of the screw fasteners 16, 16. These fasteners and portions protrude through the cover 20 and more particularly through openings provided in the face of the cover for this purpose. These openings in the cover 20 are illustrated at 20a, and as best shown in FIG. 6. The cover 20 is held in place on the outlet box back plate 10 by threaded nuts 22, 22 which also serve to secure an adaptor plate 24 to the outlet box cover 20 without the need for additional steps in the process of assembling the ceiling fan to the outlet box.

Most electrical ceiling hung fan manufacturers provide an adaptor plate such as that indicated generally at 24, and a mating canopy such as that indicated generally at 26. The canopy 26 is generally provided with a threaded unit 28 which includes an internal spherical ball (not shown) so that the fan, including the motor, can be pendulously supported from the canopy in accordance with conventional fan mounting procedures. The installer generally is directed by the fan assembly manufacturer to hang the fan assembly from the hook 24a provided in the adaptor plate after the adaptor plate has been suitably mounted to an electrical outlet box. The installer can do so with the above described assembly.

Prior to that step, however and as suggested previously, the adaptor plate 24 is secured to the outlet box 20, by the same fasteners 16 as used to secure the cover plate itself to the back plate. This provides a relatively rugged unitary configuration for the outlet box and fan, which ruggedness is achieved largely as a result of the fact that the fasteners 16, 16 are provided downwardly through the back plate 10 so that they can receive the threaded posts 18, 18 providing exposed threaded end portions at the fasteners to in turn receive both the cover and adaptor plate, 20 and 24 respectively. The threaded nuts 22, 22 secure the entire subassembly of outlet box and adaptor plate in a unit which will permit the relatively heavy ceiling fan and motor, and associated blades to be supported from a surface mounted electric outlet box. This result has not been successfully achieved in the past due to the fact that two-piece surface mounted metal outlet boxes were not designed to support a fan assembly from the point of view both of weight considerations and vibration considerations.

Thus, with the structure described above and its method of assembly, the electrical outlet box cover 20 is sandwiched between a cover that is securely anchored back plate 10, and the fan adaptor plate 24. This construction avoids any necessity for relying solely upon the manner in which the cover 20 is joined to the back plate 10 in a typical two component electric surface mounted outlet box. Typically, such conventional outlet boxes rely solely upon screw fasteners extending upwardly through openings in the cover into threaded openings provided for this purpose in the back plate 10. In accordance with the present invention, such screws are not only superfluous but in the unique assembly of the present invention are not even required.

The foregoing description relates specifically to the mechanical aspects of the hanging of a typical fan assembly in accordance with the present invention. No detailed description is provided for the wiring of the same, and no claim is made to any differences between the method of the present invention versus hanging a fan from a recessed outlet box in a ceiling structure. Where the outlet box is provided internally within the ceiling structure and is of the one-piece stamped metal configuration or the equivalent, there is no need for using the invention herein. The unique assembly of the present invention can be attributed to the fact that the outlet box 20 and the base plate 10 are essentially of conventional geometry and well-adapted to receive the wiring provided in the raceway 12 so as to afford connection with the leads and wiring provided by the electrical fan manufacturer plus the face that this cover 20 is securely clamped between the back plate 10 and the fan adaptor plate 24.

I claim:

1. A method for mounting en electrical outlet box of the surface mount type to a ceiling structure so that the electrical outlet box is capable of supporting an electric fan, said method comprising the following steps:

providing an outlet box back plate with at least two depending posts, inserting two threaded fasteners downwardly through openings in the outlet box back plate so that threaded end portions of the fasteners project beyond said at least two posts, securing the outlet box back plate to the ceiling structure, and sliding an outlet box cover onto the threaded end portions of the fasteners so that the cover abuts said at least two posts, providing an electrical raceway of the surface mount type, sliding a fan adaptor plate onto the threaded end portions of the fasteners, providing nuts onto the threaded end portions of the fasteners.

2. The method according to claim 1, wherein a further step comprises threading said at least two posts onto said threaded fasteners.

3. A surface mounted raceway and outlet box assembly for supporting an electrical fan, and comprising in combination:

an electrical raceway of the surface mount type, an electrical outlet box back plate having two openings, two downwardly projecting threaded fasteners, said back plate having two additional openings, mounting additional openings that said additional openings that serve to secure the outlet box back plate to a ceiling structure, an electrical outlet box cover having at least two openings aligned with said downwardly projecting threaded fasteners, posts provided on said threaded fasteners and having a length corresponding to the distance between the outlet box back plate and the inside of the outlet box cover, a fan adaptor plate also having openings for receiving end portions of said threaded fasteners and including means for supporting an electrical fan assembly, and threaded nuts provided on said end portions of said threaded fasteners to secure said adapter plate adjacent to said outlet box cover to provide the outlet box capable of physically supporting the electrical fan and absorbing any vibration induced by said fan assembly.

4. The assembly of claim 3, wherein said outlet box back plate has a downturned lip for receiving said outlet box cover, said outlet box cover having a central opening for receiving wires for the electrical fan assembly.

5. The assembly according to claim 4, wherein said adaptor plate is provided with a downturned lip that is adapted to receive a circumferential wall provided on a fan assembly canopy, means being provided to form a secure joint between said adaptor plate and said canopy for supporting said electrical fan assembly.

6. The assembly according to claim 5, wherein said adaptor plate includes a depending J-hook for supporting the electrical fan assembly while it is being wired.

7. The assembly according to claim 6, wherein said outlet box back plate includes peripherally spaced tongues for receiving said electrical raceway, and wherein said outlet box cover has knockout openings adapted to be removed for receiving said electrical raceway and its associated wiring for connection to the wiring of the electrical fan assembly.

8. A surface mounted electrical outlet box for use with surface mounted electrical raceway and comprising in combination:

a generally circular base plate having peripheral portions suitable for receiving the raceway, and including at least two openings for receiving threaded fasteners to secure the circular base plate to a ceiling structure, the threaded fasteners extending downwardly through the circular base plate, and threaded posts of predetermined height surrounding a portion of the threaded fasteners, and end portions of said threaded fasteners extending beyond said threaded posts, a cover of the same peripheral size and shape as said circular base plate, and having knock-out openings for receiving the raceway, said cover including at least two openings for receiving exposed said end portions of said threaded fasteners, a fan adaptor plate having at least two openings for mounting said fan adaptor plate to the face of said cover as a result of said adaptor plate being also received on the end portions of said threaded fasteners, and threaded nuts threadably received on said end portions of threaded fasteners whereby an electrical fan assembly being mounted to said adaptor plate, and said fan assembly is supported solely by said electrical outlet box.

9. The combination according to claim 8 wherein said posts comprise internally threaded members secured threadably to said threaded fasteners in such a manner as to prevent rotation of said threaded fasteners in the surface mounted said electrical outlet box.

* * * * *

UNITED STATES PATENT AND TRADEMARK OFFICE
CERTIFICATE OF CORRECTION

PATENT NO. : 5,900,583
DATED : May 4, 1999
INVENTOR(S) : Russo

It is certified that error appears in the above-identified patent and that said Letters Patent is hereby corrected as shown below:

Column 1, line 34: After "through the", delete "cover,f" and insert --cover of--.

Column 1, line 35: After "nuts are provided", delete "or" and insert --on--.

Column 1, line 54: After "FIG. 1", delete "Is" and insert --is--.

Column 1, line 62: After "two threaded posts", delete "an" and insert --all--.

Column 2, line 13: After "initially", delete "that" and insert --flat--.

Column 3, line 58: After "A method for mounting", delete "en" and insert --an--.

Column 4, line 2: After "ceiling structure," delete "and".

Column 4, line 5: After "posts," insert --and--.

UNITED STATES PATENT AND TRADEMARK OFFICE
CERTIFICATE OF CORRECTION

PATENT NO. : 5,900,583
DATED : May 4, 1999
INVENTOR(S) : Russo

It is certified that error appears in the above-indentified patent and that said Letters Patent is hereby corrected as shown below:

Column 4, line 19, delete the first "additional openings that" and insert --screws received in--.

Signed and Sealed this

Second Day of November, 1999

Attest:

Q. TODD DICKINSON

Attesting Officer

Acting Commissioner of Patents and Trademarks